US012523078B2

(12) United States Patent
Taubmann et al.

(10) Patent No.: US 12,523,078 B2
(45) Date of Patent: Jan. 13, 2026

(54) DRIVER ELEMENT FOR A VEHICLE WINDOW LIFTER AND VEHICLE WINDOW LIFTER

(71) Applicant: Brose Fahrzeugteile SE & Co. Kommanditgesellschaft, Bamberg, Bamberg (DE)

(72) Inventors: Udo Taubmann, Sülzfeld (DE); Laurent Malherbe, Bamberg (DE)

(73) Assignee: Brose Fahrzeugteile SE & Co. Kommanditgesellschaft Bamberg, Bamberg (DE)

(*) Notice: Subject to any disclaimer, the term of this patent is extended or adjusted under 35 U.S.C. 154(b) by 19 days.

(21) Appl. No.: 18/582,946

(22) Filed: Feb. 21, 2024

(65) Prior Publication Data

US 2024/0191551 A1 Jun. 13, 2024

Related U.S. Application Data

(63) Continuation of application No. PCT/EP2022/073278, filed on Aug. 22, 2022.

(30) Foreign Application Priority Data

Aug. 23, 2021 (DE) ..................... 10 2021 209 238.1

(51) Int. Cl.

| | |
|---|---|
| ***E05D 15/16*** | (2006.01) |
| ***B60J 1/17*** | (2006.01) |
| *E05F 15/689* | (2015.01) |

(52) U.S. Cl.

CPC .............. *E05D 15/165* (2013.01); *B60J 1/17* (2013.01); *E05F 15/6909* (2024.01); (Continued)

(58) Field of Classification Search

CPC ....... E05D 15/165; B60J 1/17; E05F 15/6909; E05F 2011/387; E05F 11/385; (Continued)

(56) References Cited

U.S. PATENT DOCUMENTS 4,848,032 A * 7/1989 Ballor .................. E05F 11/385 49/350
5,537,783 A * 7/1996 Kazino ................. E05F 11/385 411/366.1

(Continued)

FOREIGN PATENT DOCUMENTS

DE 102004034144 A1 2/2005
DE 10345582 A1 4/2005

(Continued)

*Primary Examiner* — Daniel J Troy
*Assistant Examiner* — Susan M. Heschel
(74) *Attorney, Agent, or Firm* — Laurence A. Greenberg; Werner H. Stemer; Ralph E. Locher

(57) ABSTRACT

A driver element for a vehicle window lifter has a pane holder for fastening to a window pane, and a rail slider for guiding on a guide rail. The pane holder has two clamping jaws which form a clamping gap for receiving the window pane. At least part of a screw element vertically penetrates the clamping jaws, the screw element has a threaded portion and a head portion. The threaded portion can be screwed into a threaded opening in the rail slider in order to brace the clamping jaws in relation to each other such that the window pane is clamped. The screw element is at least partially guided through a passage opening having an annular collar which is projectingly molded thereon. In a pre-assembly position, the screw element is interlockingly and/or frictionally engagingly held on the annular collar.

8 Claims, 4 Drawing Sheets

(52) U.S. Cl.
CPC ... *E05Y 2201/684* (2013.01); *E05Y 2600/502* (2013.01); *E05Y 2600/56* (2013.01); *E05Y 2600/632* (2013.01); *E05Y 2900/55* (2013.01)

(58) Field of Classification Search
CPC ......... E05Y 2201/684; E05Y 2600/502; E05Y 2600/632; E05Y 2600/56; E05Y 2900/55; E05Y 11/385
USPC ..................................................... 49/374, 375
See application file for complete search history.

(56) References Cited

U.S. PATENT DOCUMENTS

| | | | | | |
|---|---|---|---|---|---|
| 5,966,872 | A * | 10/1999 | Wasek | E05F 11/385 49/374 |
| 6,152,636 | A * | 11/2000 | Nass | B60J 1/17 403/DIG. 8 |
| 6,460,296 | B1 * | 10/2002 | Arquevaux | E05F 11/382 411/119 |
| 7,596,908 | B2 * | 10/2009 | Rothe | E05F 11/385 49/374 |
| 8,096,080 | B2 * | 1/2012 | Pavlovic | E05F 11/488 49/374 |
| 8,516,746 | B2 * | 8/2013 | Polimeni | E05F 11/385 49/352 |
| 8,943,750 | B2 * | 2/2015 | Twork, Jr. | E05F 11/385 49/352 |
| 10,502,398 | B2 * | 12/2019 | Toft | F21V 21/088 |
| 10,876,344 | B2 * | 12/2020 | Taubmann | E05F 15/689 |
| 11,168,501 | B2 | 11/2021 | Pavlovic | |
| 11,377,892 | B2 * | 7/2022 | Hampel | E05F 11/483 |
| 11,499,361 | B2 * | 11/2022 | Magazzini | E05F 11/488 |
| 12,060,741 | B2 * | 8/2024 | Lamoureux | E05F 11/385 |
| 2004/0107645 | A1 * | 6/2004 | Galliani | B60J 1/17 49/375 |
| 2006/0260200 | A1 * | 11/2006 | Bigourden | E05F 11/385 49/374 |
| 2019/0226261 | A1 * | 7/2019 | Taubmann | E05F 11/483 |
| 2020/0173212 | A1 * | 6/2020 | Pavlovic | E05F 11/385 |

FOREIGN PATENT DOCUMENTS

| | | | | |
|---|---|---|---|---|
| DE | 102005020052 A1 | | 11/2006 | |
| DE | 102017206018 A1 | * | 10/2018 | |
| DE | 102019131998 A1 | | 6/2020 | |
| DE | 102020201818 A1 | | 8/2021 | |
| DE | 102021202525 A1 | * | 9/2022 | |
| EP | 2644816 A2 | * | 10/2013 | E05F 11/385 |
| EP | 3514308 A1 | * | 7/2019 | B60J 1/17 |
| WO | WO-2021160460 A1 | * | 8/2021 | |
| WO | WO-2023180589 A1 | * | 9/2023 | |

* cited by examiner

DRIVER ELEMENT FOR A VEHICLE WINDOW LIFTER AND VEHICLE WINDOW LIFTER

CROSS-REFERENCE TO RELATED APPLICATION

This application is a continuation, under 35 U.S.C. § 120, of copending International Patent Application PCT/EP2022/073278, filed Aug. 22, 2022, which designated the United States; this application also claims the priority, under 35 U.S.C. § 119, of German Patent Application DE 10 2021 209 238.1, filed Aug. 23, 2021; the prior applications are herewith incorporated by reference in their entireties.

FIELD AND BACKGROUND OF THE INVENTION

The invention relates to a driver element for a vehicle window lifter, having a pane holder for fastening to a windowpane, and a rail slider for guiding on a guide rail. The invention further relates to a vehicle window lifter having such a driver element.

Nowadays, movable vehicle windowpanes are usually moved between a closed position and an open position by electrically-operated or electric-motor-operated positioning devices as vehicle window lifters. Such a (vehicle) window lifter generally contains an (electric) positioning motor and a positioning mechanism connecting the positioning motor to the windowpane, which means coupled in a force-transmitting manner, which are assigned to a motor vehicle door or a motor vehicle body.

To guide the windowpane in a vehicle door, this is provided, for example on a front and/or rear lateral window edge, with at least one driver element as a pane guide element, which is guided displaceably along the vehicle height (Z direction) in at least one guide rail acting as an adjustment or guide track of a guide device of the positioning mechanism.

Driver elements of the aforementioned type generally have a rail slider made of plastic. The rail slider typically has a main body with a guide area which, when assembled, engages around the guide rail as a rail clutch strip. In other words, the guide rail is seated in the guide area. The rail slider or the main body and the guide rail thus mesh with each other. The rail slider is supported in the engagement so as to be displaceable along the guide rail, so that the windowpane is guided linearly between the closed position and the open position.

To connect the driver element to the windowpane, the main body of the rail slider is, for example, coupled to a pane holder for the mechanical attachment to the windowpane. Here, the pane holder has, for example, two clamping jaws, which are set up and provided to receive the windowpane to be adjusted in a clamping manner between them. For this purpose, the clamping jaws can be adjustable in relation to one another. The windowpane to be connected to the driver element and to be fixed is received with its lower edge between the clamping jaws and then clamped in between these by bringing the two clamping jaws close to each other. In the course of simple and defined bracing of the two clamping jaws, use is regularly made of a screw as a clamping element, via which one of the two clamping jaws is brought close to the other clamping jaw already fastened to the rail slider main body. For this purpose, an external thread of the screw or clamping element is usually screwed into a threaded opening in the rail slider.

The screw connection between the screw and the threaded opening is not tightened here until the delivery to the customer but is positioned in a pre-assembly or delivery position, so that the clamping jaws are provided with a specific opening dimension. If this opening dimension is necessarily to be maintained, for example with a small tolerance, it is necessary to protect the screw connection from uncontrolled rotation during the transport or during handling. As a rule, this is carried out by means of a spot coating of the threaded opening and/or the screw, for example by means of Tuflok or micro encapsulation. This spot coating significantly increases the friction in the thread, however, so that when the screw is tightened for the assembly position or for clamping the windowpane, some clamping force is lost.

SUMMARY OF THE INVENTION

The invention is based on the object of specifying a particularly suitable driver element. In particular, reliable anti-rotation retention of the screw element in a pre-assembly position is to be specified. The invention is further based on the object of specifying a particularly suitable vehicle window lifter having such a driver element.

With regard to the driver element, according to the invention the object is achieved by the features of the independent driver element claim and, with regard to the vehicle window lifter, by the features of the independent vehicle window lifter claim. Advantageous refinements and developments are the subject matter of the subordinate claims. The advantages and refinements listed with regard to the driver element are also transferrable by analogy to the vehicle window lifter and vice versa.

The driver element according to the invention is provided for a vehicle window lifter and is suitable and set up for this purpose. Here, a driver element is to be understood in particular as a connecting element between a window lifter device and a windowpane. The driver element has a pane holder for fastening or attachment to a windowpane. The driver element also has a rail slider coupled to the pane holder for coupling to an (adjustment) positioning mechanism of the vehicle window lifter, in particular for the displaceable guidance on a guide rail.

The pane holder here has two clamping jaws that are movable relative to each other, which between them form a clamping gap to receive the windowpane. A screw element oriented perpendicularly thereto passes at least partly through the clamping jaws. The screw element here has a threaded portion (threaded shaft) with an external thread, and a head portion (screw head). The threaded portion of the screw element can be screwed into a threaded opening, i.e. into an approximately cylindrical opening or cut-out in the rail slider which is provided with an (internal) thread complementary to the external thread. Here, as it is screwed into the threaded opening, the screw element acts as a clamping element in order to brace the clamping jaws against each other for the in particular non-destructive clamping or retention of the windowpane.

According to the invention, the screw element is guided at least partly through a passage opening having a projectingly molded annular collar. Here, the screw element is held in a pre-assembly position by a form fit and/or force fit on the annular collar, for example designed as a passage. In other words, the pre-assembled screw element is fixed by means of the annular collar. As a result, constructionally simple and reliable retention of the screw element in the pre-assembly position is implemented. In particular, here the screw element is secured in a form-fitting and/or force-fitting manner against undesired rotation. Thus, additional spot coating of the screw element can be dispensed with.

The conjunction "and/or" is to be understood here and below in such a way that the features linked by means of this conjunction can be implemented both jointly and also as alternatives to each other.

The term "form fit" or a "form-fitting connection" between at least two parts connected to each other is understood here and below in particular to mean that the solidarity of the parts connected to each other is provided, at least in one direction, by direct interengagement of contours of the parts themselves or by an indirect interengagement via an additional connecting part. The "blocking" of a mutual movement in this direction is therefore provided by shape.

A "force fit" or a "force-fitting connection" between at least two parts that are connected to each other is understood here and below in particular to mean that the parts connected to each other are prevented from sliding on each other on account of a frictional force acting between them. If a "connecting force" (this means that force which presses the parts against each other, for example a screw force or the weight itself) causing this frictional force is lacking, the force-fitting connection cannot be maintained and is thus released.

Suitably, a (first) clamping jaw is fastened or fixed to a main body of the rail slider (rail slider main body). Here, the windowpane is fixed to the driver element via the adjustment of the other (second) clamping jaw relative to the first clamping jaw or the rail slider main body.

In the following text, statements are made with regard to the spatial directions, including in particular in a coordinate system of the motor vehicle (vehicle coordinate system) with respect to an exemplary installation situation of a vehicle window lifter in a side door of the motor vehicle. The abscissa axis (X axis, X direction) is here orientated along the vehicle longitudinal direction (direction of travel), and the ordinate axis (Y axis, Y direction) along the vehicle transverse direction, and the application axis (Z axis, Z direction) is oriented along the vehicle height.

The pane holder is implemented, for example, as a flexible clamping device or clamping part that is approximately U-shaped in cross section, wherein the clamping jaws substantially form the vertical U-legs. The horizontal U-leg acts here as a limiting stop as the windowpane is inserted between vertical U-legs or clamping jaws (clamping legs). The vertical U-legs or clamping jaws are arranged substantially in parallel XZ planes, the screw element passing approximately perpendicularly through the clamping jaws being oriented substantially along the Y direction.

In this embodiment, the windowpane is enclosed in a form-fitting manner on three sides by the U-legs when assembled and is or can be clamped in a force-fitting manner, reliably and operationally securely, by means of the change in the opening dimension between the clamping jaws that can be adjusted by the screw element. This means that an in particular force-fitting and/or form-fitting attachment to the windowpane can be implemented by means of the driver element and/or the pane holder.

In a preferred refinement, the threaded portion has a larger diameter than the passage opening or the annular collar. In other words, the threaded portion has an oversize with respect to the passage opening or with respect to the annular collar. Preferably, in the pre-assembly position, the threaded portion is screwed in a self-cutting (self-tapping) manner into an inner wall of the annular collar. In other words, the thread of the screw element dips into a passage, the internal diameter of which is smaller than the thread diameter. The passage or the annular collar is, for example, produced from a material that is softer as compared with the screw element, so that an (internal) thread is cut into the annular collar itself as it is screwed into the threaded portion for the first time. The effect is an increased torque, which avoids or at least restricts the rotation of the screw element in the pre-assembly position. The function realized as a result of "stiff screwing/unscrewing" of the screw element is additionally always provided in the predefined bandwidth of the screw-in depth in the annular collar, even after the first screwing action.

In an expedient development, the annular collar is made of a plastic material. In other words, a hole is provided in a plastic part with the purpose of limiting rotation of the screw element.

In an advantageous refinement, a cylindrical shaft portion, the diameter of which is smaller than the diameter of the passage opening, is arranged between the threaded portion and the head portion. This means that there is a smooth shaft of the screw element, the diameter of which is smaller than the diameter of the passage or the annular collar, between the thread and the screw head. Substantially no additional costs for the screw element arise from the thread-free shaft portion.

In the pre-assembly position, the threaded portion is screwed into the annular collar. As it is screwed in further in the course of the assembly, the oversize thus no longer engages between the thread and annular collar, so that shortly before an end position, the screw element can again be rotated freely and unimpededly and thus, as it is screwed into the threaded opening of the rail slider, the desired maximum clamping force is provided. This means that the form-fitting and/or force-fitting retention of the screw element in the area of the shaft portion is released. By means of the shaft portion, free rotation of the screw connection is thus made possible shortly before it locks.

In an expedient refinement, the threaded portion is screwed at least partly into the threaded opening in the pre-assembly position. As a result, the screw element is kept particularly stably in the pre-assembly position. In particular, the thread engagement in the threaded opening supports the form-fitting and/or force-fitting security against rotation by means of the annular collar.

The pane holder and the rail slider are preferably each embodied as (plastic) injection moldings. As a result, particularly cost-effective and reduced-effort production of the driver element is ensured. The rail slider is, for example, produced from a polyamide (PA) in particular from a glass-fiber-reinforced polyamide (PA-GF), for example with a glass fiber proportion of at least 50%. For example, the rail slider is produced from Grivory. For the reliable clamping of the windowpane, the pane holder is suitably produced from an at least partly flexible or elastically flexible plastic material, for example from a polypropylene (PP), in particular from a glass-fiber-reinforced polypropylene (PP-GF), for example with a glass fiber proportion of about 30%.

Here, the annular collar is molded onto the pane holder or onto the rail slider. As a result of the integration of the annular collar or of the passage in an existing part, the additional use of material for the antirotation safeguard is negligible and the tool complexity is not increased. In a preferred embodiment, the annular collar is molded onto one of the clamping jaws in one piece, that is to say integrally or monolithically. The rail slider is preferably produced from a mechanically more stable plastic material then the clamping jaws, so that the molding of the annular collar onto the clamping jaws ensures reliable screwing in or cutting in in the course of securing the threaded portion against rotation.

In a suitable development, the annular collar is molded such that it projects in the direction of the other clamping jaw. In other words, the annular collar projects into the clamping gap.

Preferably, the annular collar is molded onto the clamping jaw resting on the rail slider. Here, the annular collar is arranged substantially flush with the threaded opening. The annular collar is thus, for example, arranged immediately in front of the threaded opening in the screwing-in direction, so the annular collar acts as an alignment or positioning aid for the screwing into the threaded opening.

In an expedient refinement, the head portion of the screw element is co-rotationally coupled to a screw wheel. For example, the screw wheel is arranged between the screw head of the screw element and an outer clamping jaw facing away from the rail slider. As a result, firstly the actuation or the rotation of the screw element, and thus the adjustment of the clamping force of the clamping jaws, is simplified. Secondly, the screw wheel acts in the manner of a washer, and thus effectively enlarges the area by means of which the head portion presses against the clamping jaw as the screw element is screwed into the threaded opening, which means that more uniform and large-area clamping of the windowpane is made possible. As a result, particularly secure retention of the windowpane is ensured.

In a preferred application, the above-described driver element is part of a vehicle window lifter of a motor vehicle. By means of the vehicle window lifter, a windowpane of the motor vehicle is moved between a closed position and an open position. Here, the vehicle window lifter suitably has an electric positioning motor, which moves the windowpane via a positioning mechanism and at least one driver element. As a result, a particularly suitable vehicle window lifter is implemented.

In the installed or mounted state, the at least one driver element is functionally attached mechanically firmly to the windowpane, for example in the area of a lower or side edge, by means of the pane holder. The driver element is linearly displaceably guided on a guide rail by means of the rail slider. As a result, during a movement of the driver element along the guide rail, the windowpane is concomitantly moved between the closed position and the open position.

Other features which are considered as characteristic for the invention are set forth in the appended claims.

Although the invention is illustrated and described herein as embodied in a driver element for a vehicle window lifter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and sizes are always provided with the same designations in all the figures.

Figure 1:
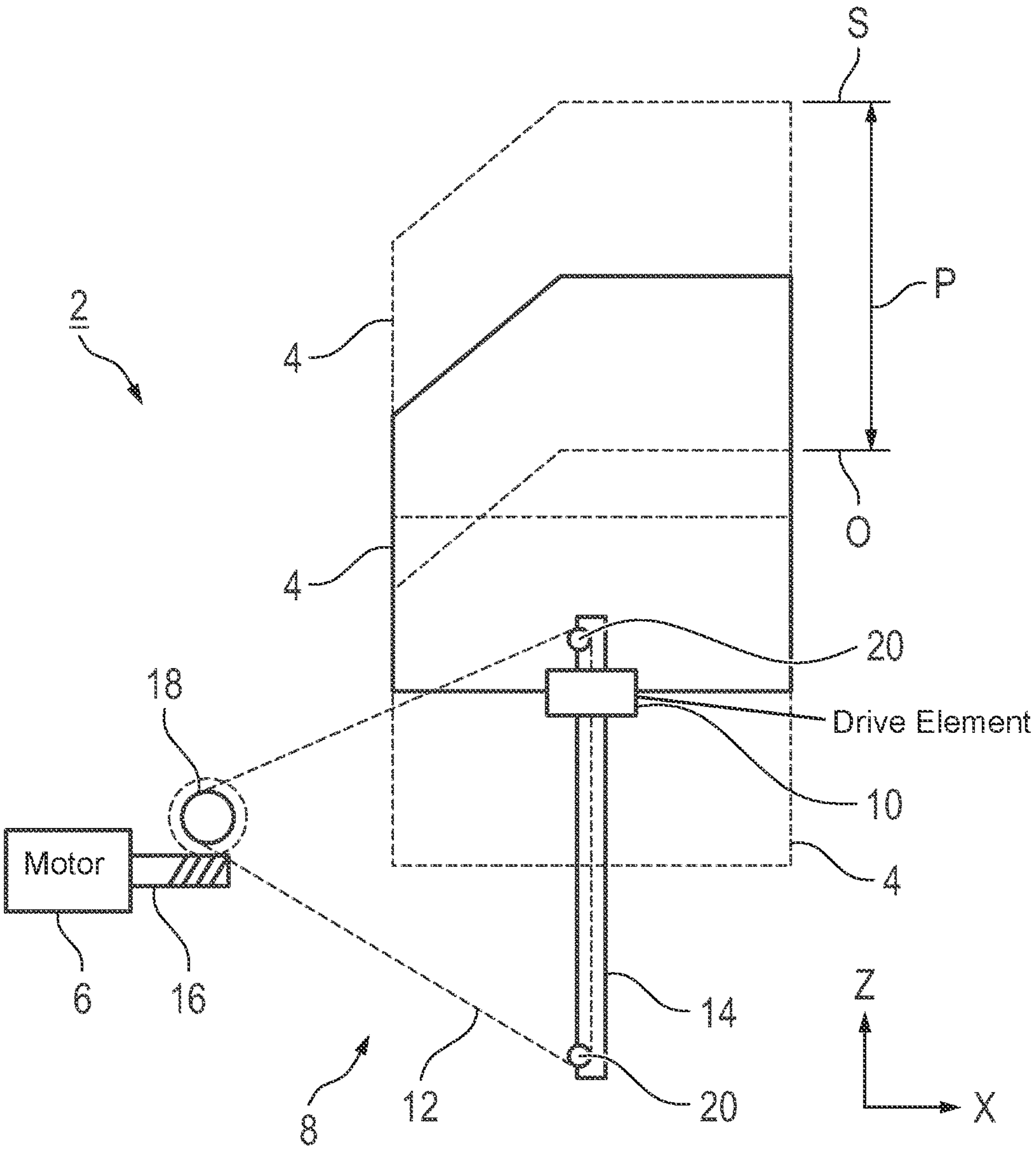
FIG. 1 is a schematic illustration of a vehicle window lifter having a positioning motor and a positioning mechanism and also having a driver element coupling the positioning mechanism and a windowpane.

Referring now to the figures of the drawings in detail and first, particularly to FIG. 1 thereof, there is show an electric vehicle window lifter 2 as a positioning device for a (vehicle) windowpane 4 of a motor vehicle is shown in FIG. 1 in a simplified and schematic illustration. The (vehicle) window lifter 2 has a positioning motor 6, which acts on the windowpane 4 by means of a positioning mechanism 8 and a driver element 10. In the exemplary embodiment shown, the positioning mechanism 8 has a pull cable 12 and a guide rail 14 for the driver element 10.

The positioning motor 6 of the window lifter 2 drives a cable drum 18 of the positioning mechanism 8 via a worm gear or spur gear mechanism 16. A pull cable of the cable pull 12 is arranged on the cable drum 18 in such a way that the pull cable is wound and unwound as a result of rotations of the cable drum 18 effected by the gear mechanism 16. The pull cable 12, implemented as a Bowden cable, for example, moves the window 4 over deflection rollers 20 of the guide rail 14.

In the event of an actuation of the positioning motor 6, the windowpane 4 is moved into its (pane) position P. Here, the windowpane 4 is reversibly movable between a closed position S, which represents the highest possible position P, and an open position O, which represents the lowest possible position P. In these positions S and O, the windowpane 4 is in each case illustrated dashed in FIG. 1. On the other hand, the windowpane 4 is illustrated in a half-opened intermediate position by continuous lines.

In the following text, statements with regard to the spatial directions are also specified in a coordinate system of the motor vehicle (vehicle coordinate system) with respect to the exemplary installation position in a side door of the motor vehicle. Here, the abscissa axis (X axis) is oriented along the vehicle longitudinal direction and the ordinate axis (Y axis) along the vehicle transverse direction, and the application axis (Z axis) is oriented along the vehicle height.

The structure of the driver element 10 is explained in more detail below with reference to FIGS. 2 to 5.

The driver element 10 has a rail slider 22, on which a guide area, not shown in more detail, is provided as a rail clutch for the linearly movable or displaceable guidance of the driver element 10 on the guide rail 14 of the window lifter 2. In addition to the guide area, the rail slider 22 has a fastening area 24 for the coupling and fastening to the pull cord of the cable pull 12.

The fastening area 24 has two nipple chambers 26, on which cable nipples of the pull cable 12 can be hooked or suspended, so that a positioning force transmitted via the pull cable acts on the driver element 10 and moves or displaces the latter along the guide rail 14.

The rail slider 22 of the driver element 10 is coupled to a pane holder 28 for the mechanical attachment or coupling of the driver element 10 to the windowpane 4.

Figure 2:
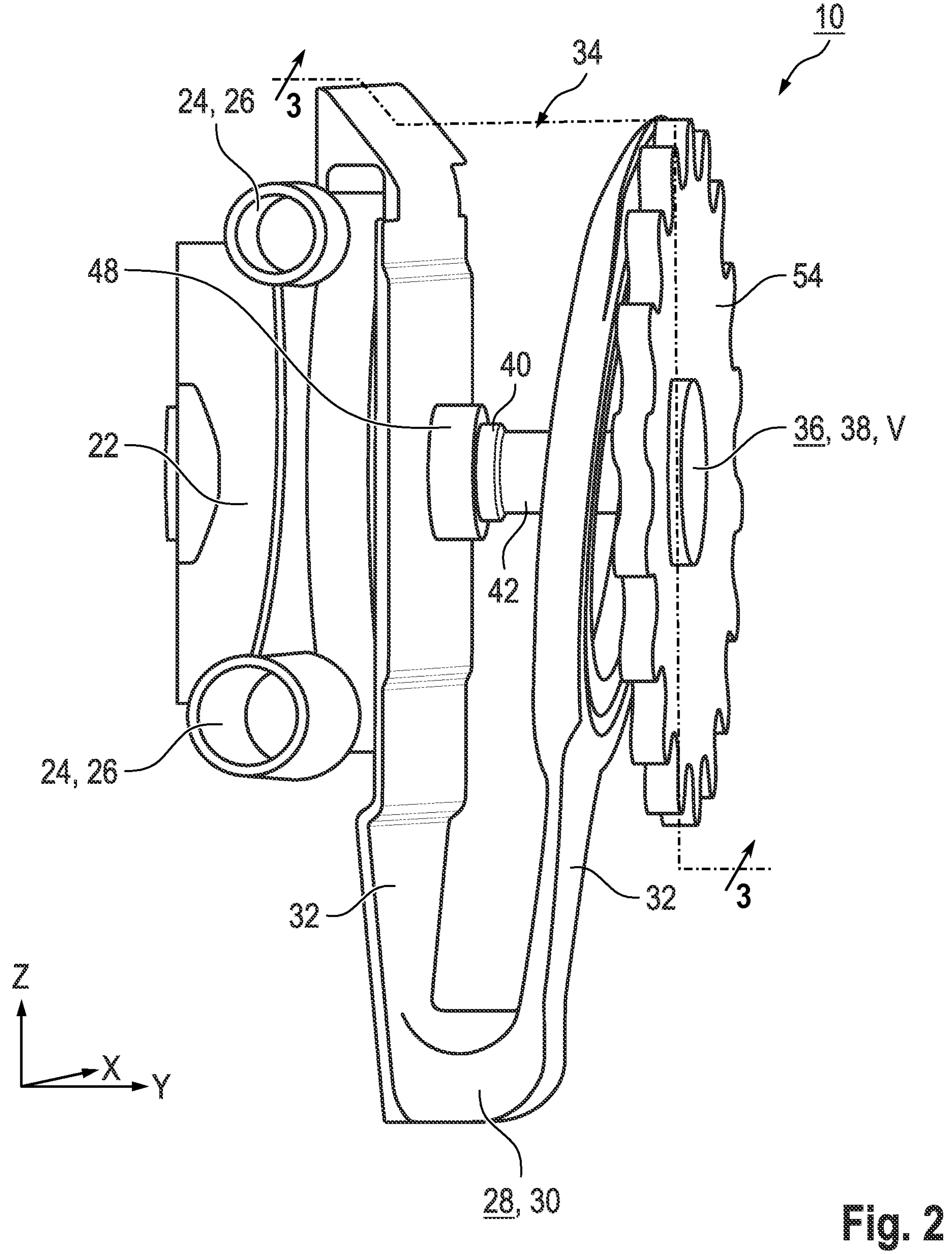
FIG. 2 is a perspective view of the driver element with a clamping pane holder and with a rail slider.
Figure 3:
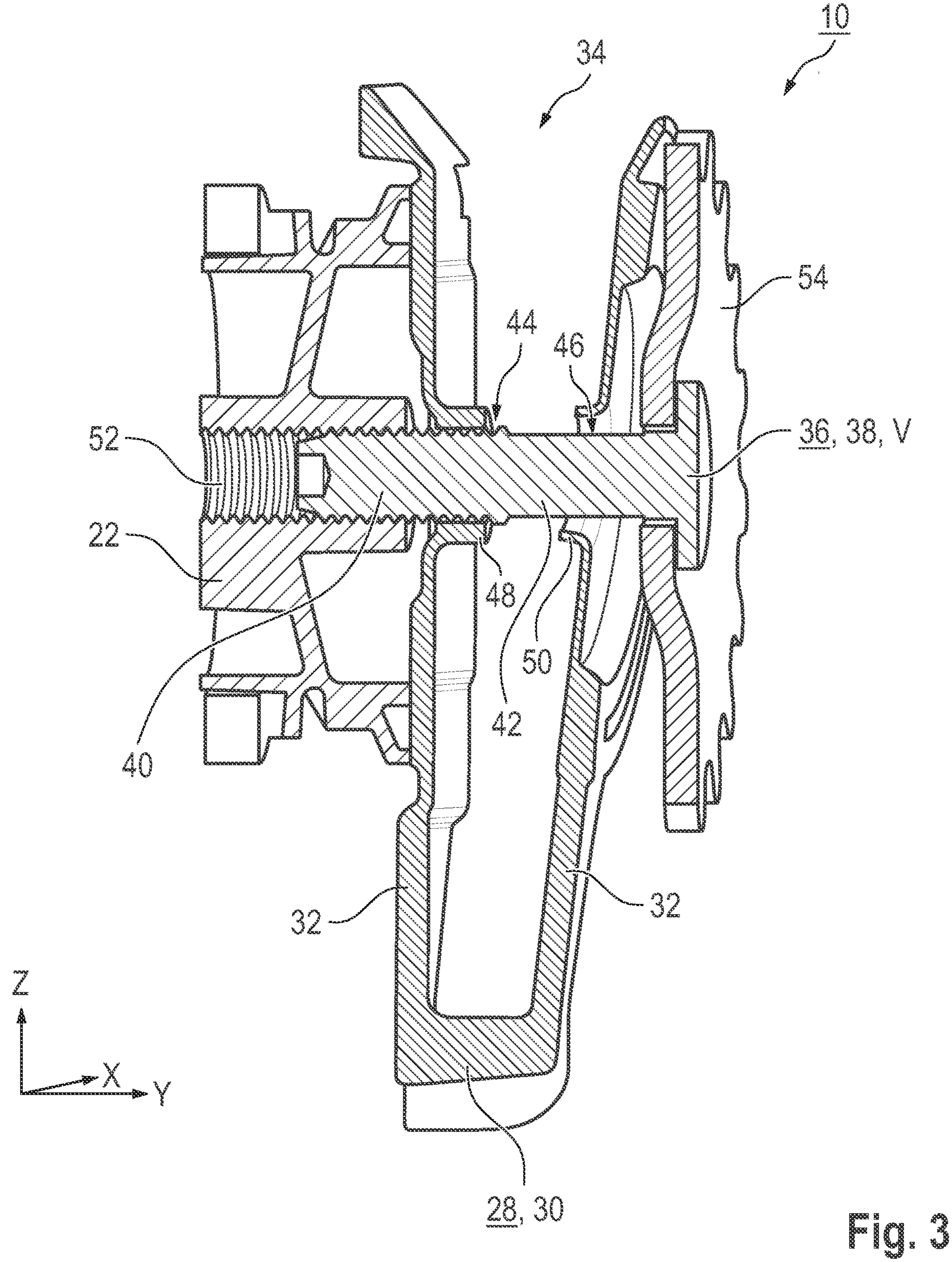
FIG. 3 is a perspective sectional view of the driver element as taken along section line 3-3 of FIG. 2.

The pane holder 28 has an elastically flexible clamping device which—as can be seen in particular in FIG. 2 and FIG. 3—has an approximately U-shaped cross-sectional shape in the YZ plane. The horizontal U leg here is formed by a connecting portion 30 oriented along the Y-direction, which couples the two vertical U legs as clamping legs or clamping jaws 32 for an in particular form-fitting and clamping connection or attachment of the driver element 10 to the windowpane 4.

Formed between the clamping jaws 32 is a clear space as a receiving or clamping gap 34, into which the windowpane 4 can be inserted as intended in the region of a pane lower edge. In the installation or mounting position, the windowpane 4 is thus partly arranged between the two clamping jaws 32. For the simplified insertion of the windowpane, the free ends of the clamping jaws 32 are bent away from the clamping gap 34 in the manner of a chamfer.

For the purpose of reliable and operationally secure clamping or attachment to the windowpane 4, the pane holder 28 has a screw element 36. Here, the screw element 36 has a screw head as a head portion 38 and a cylindrical or bolt-shaped screw shaft integrally molded thereon, the screw shaft being partly provided with an external thread at the free end. The portion of the screw shaft provided with the external thread is designated below as a threaded portion 40, the thread-less region of the screw shaft between the threaded portion 40 and the head portion 38 also being designated as a shaft portion 42 below.

The clamping jaws 32 each have a cut-out or passage opening 44, 46 for the screw shaft of the screw element 36 (FIG. 3). The passage opening 44 here is introduced into the clamping jaws 32 resting on the rail slider 22, the passage opening 46 being introduced into the clamping jaws 32 arranged opposite. The passage openings 44, 46 are each surrounded by a projecting annular collar 48, 50 as a passage, wherein the mutually aligned annular collars 48, 50 facing each other project into the clamping gap 34. The annular collars 48, 50 here act as a stop or as a limitation during the clamping fastening of the windowpane 4, wherein the common height of the annual collars 48, 50 substantially defines a minimum gap width of the clamping gap 34 in the course of the clamping fastening. Here, the annular collar 48 surrounds the passage opening 44; the annular collar 50 surrounds the passage opening 46.

Here, the screw element 36 is seated in the passage openings 44, 46, so that the screw element 36 penetrates the clamping gap 34 parallel to the connecting portion 30 and to the Y direction. In the mounted or installed state, the screw element 36 is here guided between the clamping jaws 32 for example through a hole in the windowpane 4, so that the windowpane 4 is held on the driver element 10 in a form-fitting manner, firstly on three sides by the pane holder 28 and secondly by means of the screw element 36.

For the additional clamping or force-fitting retention of the windowpane 4, the threaded portion 40 of the screw element 36 is screwed into a threaded opening 52 of the rail slider 22. Because of the flexible design of the clamping device, the clamping jaws 32 are movable relative to each other as the screw element 36 is screwed into the threaded opening 52 passing through the rail slider 22. The head portion 38 here is larger than the passage opening 46 of the clamping jaws 32 for the screw shaft, so that the head portion 38 engages behind the outer clamping jaw 32 in a form-fitting manner. As the threaded portion 40 is screwed into the threaded opening 52, in particular the outer clamping jaw 32 facing away from the rail slider 22 is thus moved toward the inner clamping jaw 32 resting on the rail slider 22, and thus reduces the gap dimension or the opening dimension of the clamping gap 34, until the annular collars 48, 50 rest on each other. As a result, mechanical pre-loading of the clamping jaws 32 is effected, which clamps the windowpane 4 reliably and nondestructively.

The screw element 36 is, for example, co-rotationally connected to a screw wheel 54 for easier actuation. The screw wheel 54 here is arranged between the head portion 38 and the outer clamping jaw 32.

The threaded opening 52 is, for example, designed as a plastic thread of the rail slider 22 or the main body thereof. The threaded opening 52 is here introduced into the preferably high-strength plastic material of the rail slider 22 or the main body of the latter in the course of injection-molding production of the rail slider 22. The threaded opening 52 is provided with an internal thread complementary to the threaded portion 40, which, for example, is molded directly into the material of the rail slider 22 during the injection molding process.

The pane holder 28 is configured as an injection-molded plastic part, wherein the annular collars 48, 50 are molded in one piece, that is to say integrally or monolithically, onto the clamping jaws 32. The diameter of the threaded portion 40 of the screw element 36 is dimensioned to be larger than the diameter of the shaft portion 42. The annular collar 50 or the passage opening 46 here has an internal diameter which is larger than the diameter of the threaded portion 40, so that the screw shaft can be guided easily through the outer clamping jaw 32.

The threaded portion 40 has a diameter which is larger than the passage opening 44 or the annular collar 48. The internal diameter of the annular collar 48 is therefore smaller than the external diameter of the threaded portion 40. The diameter of the shaft portion 42 here is designed to be smaller than the diameter of the annular collar 48.

Figure 4:
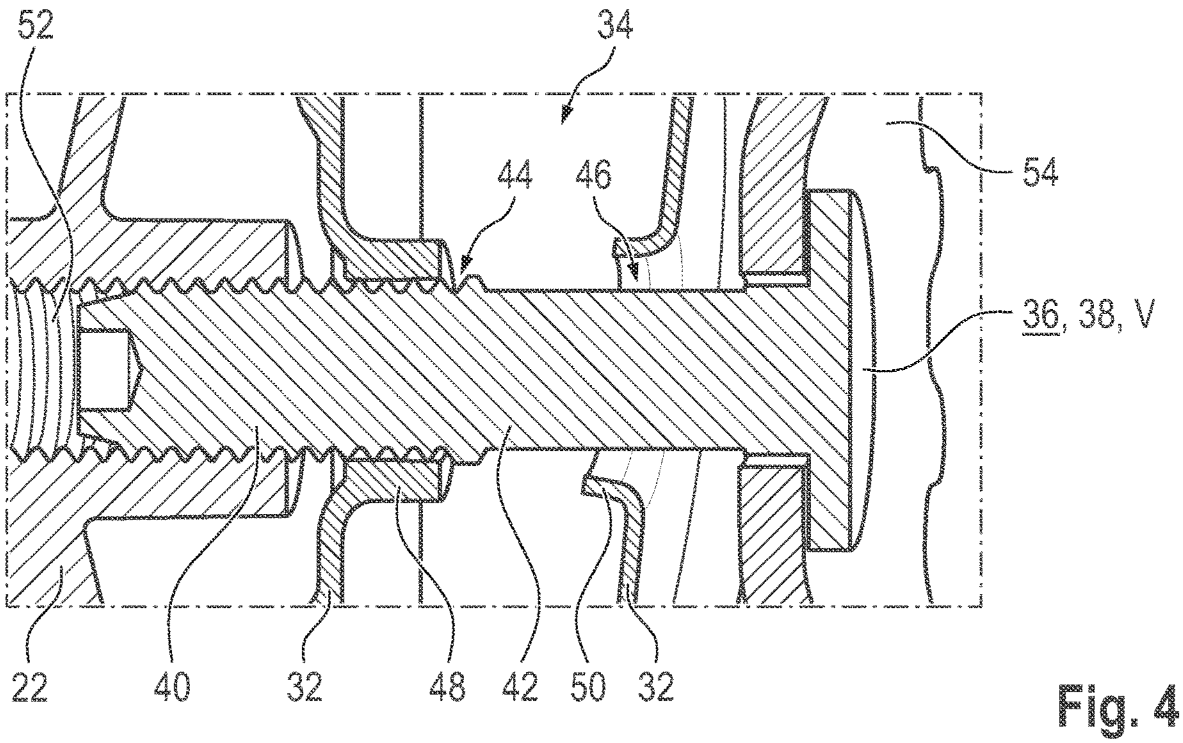
FIG. 4 is a perspective sectional view of a detail of the driver element with a screw element in a pre-assembly position.

FIGS. 2, 3 and 4 show the screw element 36 in a pre-assembly position V, in which the screw element 36 is pre-assembled on the driver element 10. The threaded portion 40 here is screwed into the inner wall of the annular collar 48 in a self-tapping manner. In other words, the annular collar 48 is produced without a thread, a thread being cut into the inner wall of the annular collar 40 in the course of the pre-assembly by the threaded portion 40 being screwed in for the first time. As a result, the effect is an increased torque, which avoids or at least restricts rotation of the screw element 36 in a form-fitting and/or force-fitting manner when in the pre-assembly position V. In the pre-assembly position V, the free end of the threaded portion 48 is also screwed at least partly into the thread of the threaded opening 52.

Figure 5:
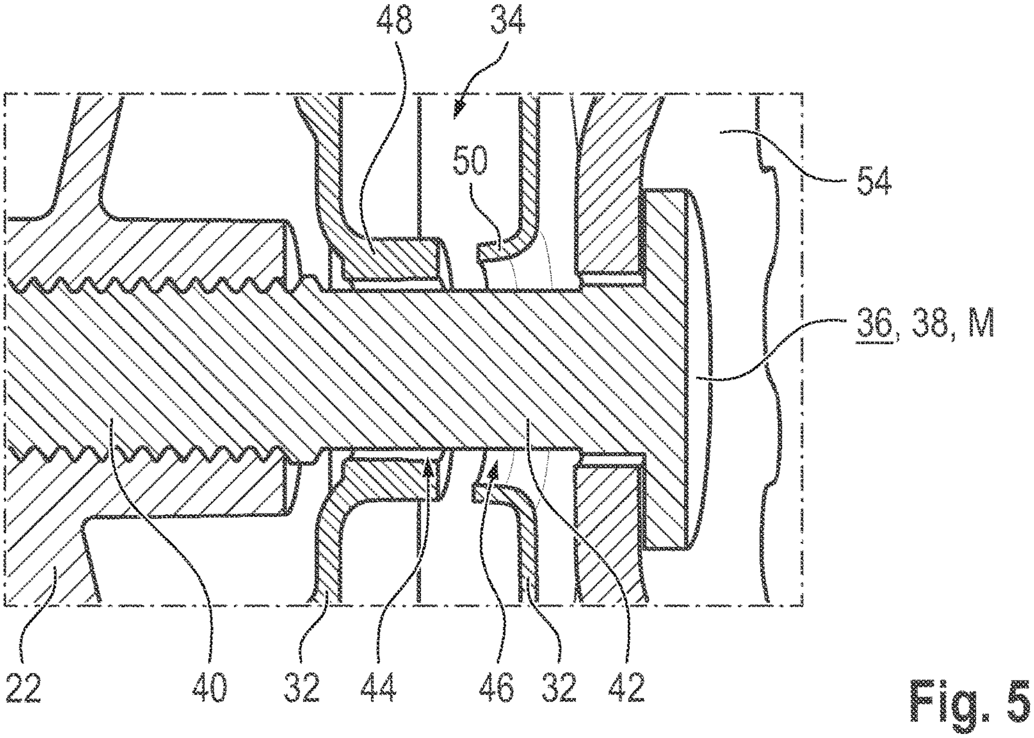
FIG. 5 is a perspective sectional view of a detail of the driver element with the screw element in an assembled position.

In the pre-assembly position V, the threaded portion 40 is screwed into the annular collar 48. As it is screwed in further in the course of the assembly, the overlap between the threaded portion 40 and the annular collar 40 no longer grips because of the smaller shaft portion 42, so that the screw element 36 can be screwed substantially freely and unimpededly into the threaded opening 52, and thus the desired maximum clamping force for fixing the windowpane 4 is provided (FIG. 5). This means that the form-fitting and/or force-fitting retention of the screw element 36 in the pre-assembly position is released in the area of the shaft portion 42, so that the screw element 36 is movable into an assembled position M, shown in FIG. 5, with a reduced screwing resistance.

The invention is not restricted to the above-described exemplary embodiment. Instead, other variants of the invention can also be derived therefrom by those skilled in the art without departing from the subject matter of the invention. In particular, all the individual features described in connection with the exemplary embodiment can also be combined with one another in another way without departing from the subject matter of the invention.

The following is a summary list of reference numerals and the corresponding structure used in the above description of the invention:

LIST OF DESIGNATIONS

2 Vehicle window lifter
4 Windowpane
6 Positioning motor
8 Positioning mechanism
10 Driver element
12 Pull cable
14 Guide rail
16 Gears
18 Cable drum
20 Deflection roller
22 Rail slider
24 Fastening area
26 Nipple chamber
28 Pane holder
30 Connecting portion
32 Clamping jaw
34 Clamping gap
36 Screw element
38 Head portion
40 Threaded portion
42 Shaft portion
44, 46 Passage opening
48, 50 Annular collar
52 Threaded opening
54 Screw wheel
P Pane position
S Closed position
O Open position
X Vehicle longitudinal direction
Y Vehicle transverse direction
Z Vehicle vertical direction
V Pre-assembly position
M Assembled position

The invention claimed is:

1. A driver element for a vehicle window lifter having a guide rail, the driver element comprising:

a pane holder for fastening to a windowpane, said pane holder having two clamping jaws defining a clamping gap therebetween to receive the windowpane, at least one of said two clamping jaws having a projectingly molded annular collar having a passage opening formed therein;

a rail slider for guiding on the guide rail of the vehicle window lifter, said rail slider having a threaded opening formed therein; and a screw element passing perpendicularly at least partly through said clamping jaws, said screw element having a threaded portion and a head portion, said threaded portion being screwed into said threaded opening of said rail slider to brace said clamping jaws against each other to clamp the windowpane, wherein said screw element is guided at least partly through said passage opening of said projectingly molded annular collar, said threaded portion having a larger diameter than said passage opening, and wherein, in a pre-assembly position, said screw element passes through said clamping gap and said threaded portion is screwed into an inner wall of said projectingly molded annular collar such that said screw element is held by a form fit or force fit on said projectingly molded annular collar;

said screw element having a cylindrical shaft portion disposed between said threaded portion and said head portion, a diameter of said cylindrical shaft portion being smaller than a diameter of said passage opening; and in an assembled position, said threaded portion being screwed into said threaded opening such that said cylindrical shaft portion is disposed in said projectingly molded annular collar and, due to the smaller diameter of said cylindrical shaft portion, said threaded portion and said projectingly molded annular collar no longer engage one another and said form-fit or force fit between said screw element and said projectingly molded annular collar is released.

2. The driver element according to claim 1, wherein said projectingly molded annular collar is made from plastic material.

3. The driver element according to claim 1, wherein in the pre-assembly position, said threaded portion is screwed at least partly into said threaded opening of said rail slider.

4. The driver element according to claim 1, wherein said projectingly molded annular collar is molded onto one of said clamping jaws in one piece.

5. The driver element according to claim 4, wherein said projectingly molded annular collar is molded such that said projectingly molded annular collar projects in a direction of another one of said clamping jaws.

6. The driver element according to claim 1, wherein said projectingly molded annular collar is molded onto one of said clamping jaws.

7. The driver element according to claim 1, further comprising a screw wheel being co-rotationally coupled to said head portion.

8. A vehicle window lifter for a motor vehicle, the vehicle window lifter comprising:

said driver element according to claim 1.

* * * * *